United States Patent Office 3,452,023
Patented June 24, 1969

---

3,452,023
4,5,6,6a,7,7a,12,12a - OCTAHYDROISOQUINO[8,8a,1-a,b]-CARBAZOLE-1,2-DIOLS AND PROCESS FOR THEIR PRODUCTION
John Shavel, Jr., Mendham, and Glenn Curtis Morrison, Dover, N.J., assignors to Warner-Lambert Pharmaceutical Company, Morris Plains, N.J., a corporation of Delaware
No Drawing. Filed Apr. 6, 1966, Ser. No. 540,512
Int. Cl. C07c 35/22, 101/00; C07d 35/00
U.S. Cl. 260—286                9 Claims

ABSTRACT OF THE DISCLOSURE

The present invention discloses a new class of heterocyclic compounds having the following structural formula:

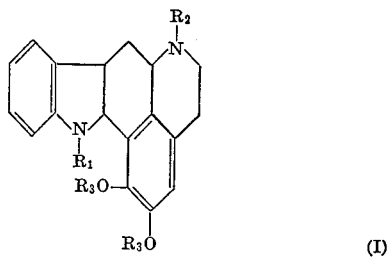

(I)

wherein $R_1$, $R_2$ and $R_3$ each represents hydrogen, lower alkyl of 1 to 6 carbon atoms such as methyl, ethyl, isobutyl and the like, and acyl of a carboxylic acid such as acetyl, benzoyl and the like.

The compounds are useful as central nervous system stimulants and as anti-bacterial agents.

---

This invention relates to new and useful heterocyclic compounds and relates more particularly to new and novel 4,5,6,6a,7,7a,12,12a - octahydroisoquino[8,8a,1 - a,b]carbazole-1,2-diols having the formula

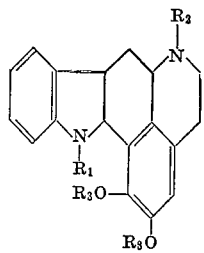

wherein $R_1$, $R_2$ and $R_3$ each represents hydrogen, lower alkyl of 1 to 6 carbon atoms such as methyl, ethyl, isobutyl and the like, and acyl of a carboxylic acid such as acetyl, benzoyl and the like. The symbols $R_1$, $R_2$ and $R_3$ as used hereinafter have the same meaning as defined.

The numbering of the compounds of this invention is as follows:

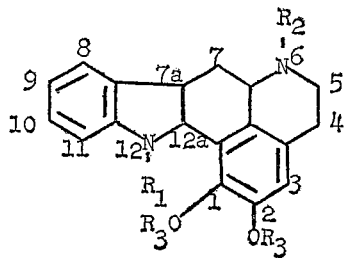

Also embraced within the scope of this invention are the pharmaceutically acceptable acid addition salts of the above described basis, their quaternary ammonium salts and their N-oxides.

This invention also includes within its scope a new and novel process for preparing the above compounds as well as the intermediates useful for their synthesis.

The compounds of this invention exhibit significant biological activity and are useful as central nervous system stimulants and as antibacterial agents. For use as a topical antibacterial about 1 part by weight of the selected active ingredient is mixed with about 99 parts by weight of a suitable carrier such as talc or starch and applied to the desired site.

In addition, these compounds are valuable intermediates in the production of other compounds of the 4,5,6,6a,7,7a,12,12a-octahydroisoquino[8,8a,1-a,b]carbazole - 1,2-diol series.

The compounds of this invention are prepared by reacting indole-3-acetic acid of the formula

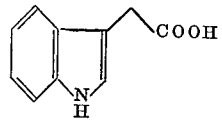

(1)

with an amine of the formula

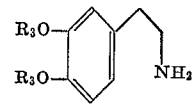

(2)

to form an amide of the formula

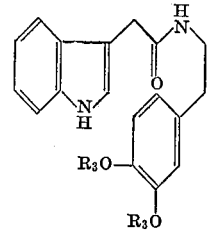

(3)

This reaction is carried out by heating the acid and amine at an elevated temperature such as 175°.

On treatment of the amide 3 with a cyclodehydration agent such as phosphorous oxychloride or phosphorous pentoxide followed by reduction with an alkali metal borohydride such as sodium borohydride there is formed an isoquinoline of the formula

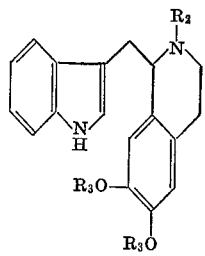

(4)

where $R_2$=H.

The isoquinoline can be converted to its corresponding lower alkyl derivatives ($R_2$) by treatment with an acylating agent such as acetic anhydride or ethyl formate followed by reduction with lithium aluminum hydride.

Treatment of the isoquinoline 4 with a strong acid such as hydrobromic acid results in the formation of a 4,5,6,6a, 7,7a,12,12a - octahydroisoquino[8,8a,1 - a,b]carbazole-1,2-diol of the formula

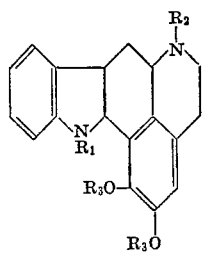

(5)

where $R_1=R_3=H$.

When $R_2$ is hydrogen, treatment of 5 with an acylating agent such as acetic anhydride produces a tetraacyl derivative where $R_1$, $R_2$ and $R_3$ are acyl.

When $R_2$ is lower alkyl the same procedure gives rise to a triacyl derivative where $R_1$ and $R_3$ are acyl and $R_2$ is lower alkyl.

Passage of the acyl derivatives over basic alumina in a solvent such as methylene chloride-methanol mixtures results in hydrolysis of the oxygen acyl groups to give diols of 5 where $R_3$ is H.

The foregoing reaction may be illustrated by the following schematic diagram:

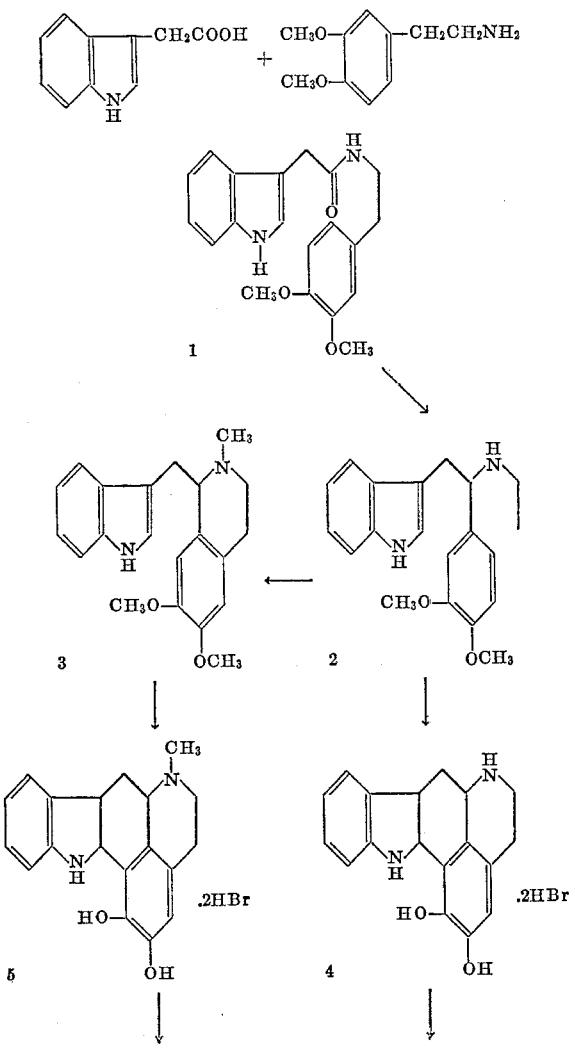

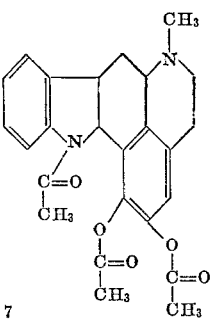 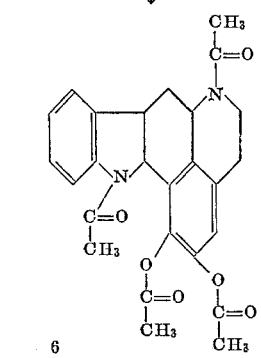

7   6

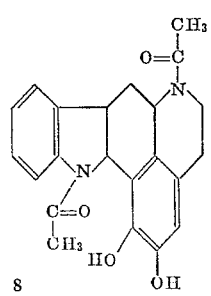

8

The compounds of this invention may be converted into their pharmaceutically acceptable nontoxic acid addition and quaternary ammonium salts by conventional procedures. Exemplary of nontoxic acid addition salts are those formed with maleic, fumaric, succinic, tartaric, citric, malic, cinnamic, sulfonic, hydrochloric, hydrobromic, sulfuric, phosphoric and nitric acids. The acid addition salts may be prepared in the conventional manner, by treating a solution or suspension of the free base in an organic solvent with the desired acid, and then recovering the salt which forms by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluene sulfonate. The N-oxides are obtained by treating the free base with an oxidizing agent such as hydrogen peroxide.

The following examples are included in order further to illustrate the invention. All temperatures are given in degrees centigrade.

EXAMPLE 1

N-(3,4-dimethoxyphenethyl)indole-3-acetamide

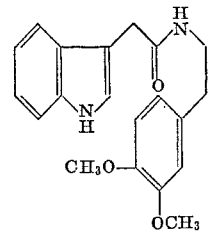

A mixture of 71.5 g. of 3,4-dimethoxyphenethylamine and 64.2 g. of indole-3-acetic acid was heated at 175° for 20 hr. under a stream of nitrogen. The reaction mixture was taken up in chloroform and was washed with 5% hydrochloric acid, 5% sodium carbonate solution, and water. The chloroform layer was dried over sodium sulfate and the solvent was removed. Recrystallization of the residue gave 84 g. (63%) of a solid, M.P. 117–119°.

Further recrystallization gave an analytical sample, M.P. 120–121.5°:

*Analysis.*—Calcd. for $C_{20}H_{22}N_2O_3$: C, 70.98; H, 6.55; N, 8.28. Found: C, 70.70; H, 6.63; N, 8.57.

EXAMPLE 2

1,2,3,4-tetrahydro-1 - (indol-3-ylmethyl) - 6,7-dimethoxy-isoquinoline

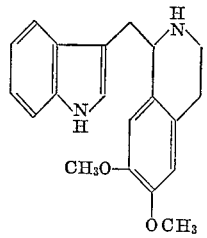

A solution of 204 g. of N-(3,4-dimethoxyphenethyl) indole-3-acetamide in 450 ml. of phosphorous oxychloride was allowed to stand at room temperature for 20 hr. The reaction mixture was poured into 3 liters of ether. The precipitate was rubbed up to a gummy consistency and the supernatant decanted. The gum was then washed with an additional 1.5 l. of ether. The residue was dissolved in 3 l. of ethanol, diluted with 500 ml. of water and the pH was adjusted to 3 with 10% sodium hydroxide solution. Portionwise, 50 g. of sodium borohydride was added while the temperature was held at 20–30°. After the addition had been completed stirring was continued for an additional 30 min. The pH was adjusted to 2 with 20% hydrochloric acid and then 11 with 40% sodium hydroxide solution. After the addition of 1200 ml. of water the mixture was extracted with ether. The ether layer was dried over sodium sulfate and the solvent removed. Recrystallization of the residue from benzene gave 87 g. (45%) of a solid, M.P. 156–157°.

*Analysis.*—Calcd. for $C_{20}H_{22}N_2O_2$: C, 74.51; H, 6.88; N, 8.69. Found: C, 74.50; H, 6.62; N, 8.44.

EXAMPLE 3

1,2,3,4-tetrahydro-1 - (indol-3-ylmethyl) - 6,7-dimethoxy-isoquinoline

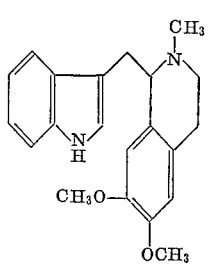

A solution of 30.0 g. of 1,2,3,4-tetrahydro-1-(indol-3-ylmethyl)-6,7-dimethoxyisoquinoline in 300 ml. of ethyl formate was refluxed for 25 hr. On standing there was deposited 30 g. of a solid which was dissolved in 1 l. of tetrahydrofuran and added to a suspension of 10.0 g. of lithium aluminum hydride in 250 ml. of tetrahydrofuran. After the addition had been completed stirring was continued for 6 hr. The excess hydride was destroyed by the cautious dropwise addition of water. The reaction mixture was filtered and the solvent removed. The residue after recrystallization from benzene-Skellysolve B gave 25.5 (67%) of a crystalline solid, M.P. 124.5–126°. Further recrystallization gave an analytical sample, M.P. 125–126°.

*Analysis.*—Calcd. for $C_{21}H_{24}N_2O_2$: C, 74.97; H, 7.19; N, 8.33. Found: C, 74.88; H, 7.22; N, 8.54.

EXAMPLE 4

4,5,6,6a,7,7a,12,12a-octahydroisoquino[8,8a,1-a,b]carbazole-1,2-diol dihydrobromide

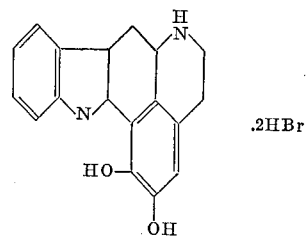

A solution of 500 mg. of 1,2,3,4-tetrahydro-1-(indol-3-ylmethyl)-6,7-dimethoxyisoquinoline in 70 ml. of hydrobromic acid was refluxed for 20 hr. On cooling there was deposited 293 mg. (50%) of a crystalline solid, M.P. 333° dec. Recrystallization from methanol gave an analytical sample, M.P. 320–321° dec.

*Analysis.*—Calcd. for $C_{18}H_{20}N_2O_2Br_2$: C, 47.39; H, 4.42; N, 6.14; Br, 35.03. Found: C, 47.20; H, 4.53; N, 6.20; Br, 35.00.

EXAMPLE 5

4,5,6,6a,7,7a,12,12a-octahydro-6-methylisoquino[8,8a,3-a,b]-carbazole-1,2-diol dihydrobromide monohydrate

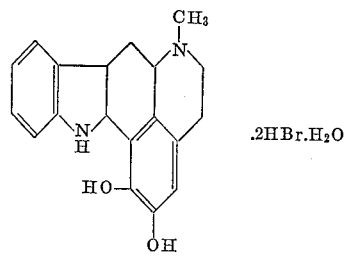

A solution of 10.0 g. of 1,2,3,4-tetrahydro-1-(indol-3-ylmethyl)-6,7-dimethoxy-6-methylisoquinoline in 150 ml. of hydrobromic acid was refluxed for 15 hr. The reaction mixture was concentrated in vacuo (100 mm.) to 100 ml. On standing there was deposited 2.8 g. (20%) of a crystalline solid, M.P. 245–255°. Concentration to 30 ml. gave an additional 3.5 g. (25%), M.P. 269–275°. Recrystallization from water gave an analytical sample, M.P. 258–263°.

*Analysis.*—Calcd. for $C_{19}H_{24}Br_2N_2O_3$: C, 46.74; H, 4.95; N, 5.74; Br, 32.73. Found: C, 46.92; H, 5.08; N, 5.99; Br, 32.55.

EXAMPLE 6

6,12-diacetyl-4,5,6,6a,7,7a,12,12a-octahydroisoquino[8,8a,1-a,b]carbazole-1,2-diol diacetate

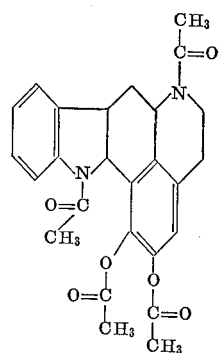

A solution of 430 mg. of 4,5,6,6a,7,7a,12,12a-octahydroisoquino[8,8a,1-a,b]carbazole - 1,2 - diol dihydrobromide, 8 ml. of pyridine, and 8 ml. of acetic anhydride was allowed to sand at room temperature for 20 hr. The reaction mixture was stripped in vacuo, taken up in ethyl acetate-petroleum, washed with dilute ammonium hydroxide and water, dried over sodium sulfate, and the solvent was removed. Chromatography on neutral alumina gave on elution with benzene 394 mg. (91%) of a solid which after recrystallization from ethyl acetate-petroleum ether (30–60°) gave an analytical sample, M.P. 131.5–132°.

Analysis.—Calcd. for $C_{28}H_{26}N_2O_6$: C, 67.52; H, 5.67; N, 6.06. Found: C, 67.77; H, 5.86; N, 6.34.

EXAMPLE 7

12-acetyl-4,5,6,6a,7,7a,12,12a-octahydro-6-methylisoquino-[8,8,1-a,b]carbazole-1,2-diol diacetate

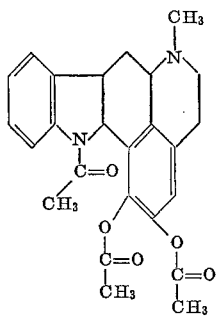

To a solution of 10.0 g. of 4,5,6,6a,7,7a,12,12a-octahydro-6-methylisoquino[8,8a,3-a,b]carbazole-1,2-diol dihydrobromide monohydrate in 250 ml. of pyridine was added 100 ml. of acetic anhydride. After standing for 20 hr. at room temperature the volatiles were removed in vacuo at 50°. Chromatography of the residue on neutral alumina gave on elution with methylene chloride an oil. Crystallization from benzene-Skellysolve B gave 3.0 g. (30%) of a solid, M.P. 180–181.5°. Further recrystallization gave an analytical sample, M.P. 183–184°.

Analysis.—Calcd. for $C_{25}H_{28}N_2O_5$: C, 69.11; H, 6.03; N, 6.45. Found: C, 69.14; H, 6.15; N, 6.57.

EXAMPLE 8

6,12-diacetyl-4,5,6,6a,7,7a,12,12a-octahydroisoquino [8,8a,1-a,b]carbazole-1,2-diol

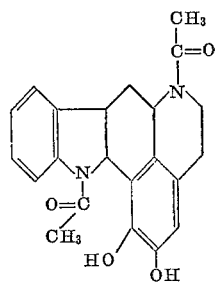

A solution of 14.8 g. of 4,5,6,6a,7,7a,12,12a-octahydroisoquino[8,8a,1-a,b]carbazole - 1,2-diol dihydrobromide, 300 ml. of pyridine and 150 ml. of acetic anhydride was allowed to sand for 20 hr. The reaction mixture was stripped in vacuo at 50° and the residue dissolved in 250 ml. of methylene chloride. Chromatography on alumina gave on elution with 10% methanol in methylene chloride, after recrystallization from methanol, 3.6 g. (30%) of a crystalline solid, M.P. 251–252°.

Analysis.—Calcd. for $C_{22}H_{22}N_2O_4$: C, 69.82; H, 5.86; N, 7.40. Found: C, 69.75; H, 6.00; N, 7.22.

Having described our invention, what we desire to secure by Letters Patent is:

1. The compound of the formula:

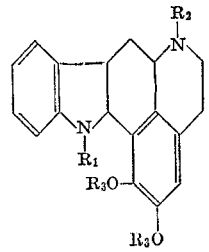

wherein $R_1$, $R_2$ and $R_3$ are each hydrogen and lower alkyl, its pharmaceutical acceptable acid addition salts, its N-oxides, and its quaternary ammonium salts.

2. A compound of the formula:

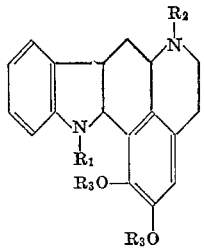

wherein $R_1$, $R_2$ and $R_3$ are each hydrogen and lower or benzoic acid and $R_2$ is hydrogen, lower alkyl or acyl of a lower alkanoic acid or benzoic acid.

3. 6,12 - diacetyl - 4,5,6,6a,7,7a,12,12a-octahydroisoquino[8,8a,1-a,b]carbazole-1,2-diol.

4. 12 - acetyl-4,5,6,6a,7,7a,12,12a-octahydro-6-methylisoquino[8,8a,1-a,b]carbazole-1,2-diol diacetate.

5. 6,12 - diacetyl - 4,5,6,6a,7,7a,12,12a-octahydroisoquino[8,8a,1-a,b]carbazole-1,2-diol diacetate.

6. 4,5,6,6a,7,7a,12,12a-octahydro - 6 - methylisoquino-[8,8a,3-a,b]carbazole-1,2-diol dihydrobromide monohydrate.

7. 4,5,6,6a,7,7a,12,12a - octahydroisoquino[8,8a,1-a,b] carbazole-1,2-diol dihydrobromide.

8. Process for the production of the salt of the compound of the formula:

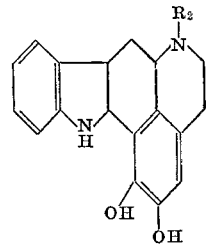

in which $R_2$ is hydrogen or lower alkyl which comprises contacting a compound of the formula:

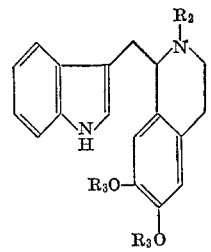

with a mineral acid wherein $R_3$ is hydrogen.

9. Process according to claim 8 wherein said mineral acid is hydrobromic acid.

References Cited

UNITED STATES PATENTS 3,326,923   6/1967   Shavel et al. _____ 260—288

ALEX MAZEL, Primary Examiner.

D. G. DAUS, Assistant Examiner.

U.S. Cl. X.R.

260—287, 288, 326.13, 558, 570.8; 424—258